(12) United States Patent
Lee et al.

(10) Patent No.: US 11,032,376 B2
(45) Date of Patent: Jun. 8, 2021

(54) ELECTRONIC DEVICE FOR CONTROLLING REGISTRATION SESSION, AND OPERATION METHOD THEREFOR; AND SERVER, AND OPERATION METHOD THEREFOR

(71) Applicant: Samsung Electronics Co., Ltd., Suwon-si (KR)

(72) Inventors: Kangsoo Lee, Suwon-si (KR); Pilsik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,217

(22) PCT Filed: Dec. 13, 2018

(86) PCT No.: PCT/KR2018/015837
§ 371 (c)(1),
(2) Date: Jun. 11, 2020

(87) PCT Pub. No.: WO2019/117644
PCT Pub. Date: Jun. 20, 2019

(65) Prior Publication Data
US 2021/0099526 A1   Apr. 1, 2021

(30) Foreign Application Priority Data

Dec. 14, 2017   (KR) .................. 10-2017-0172394

(51) Int. Cl.
*G06F 15/16* (2006.01)
*H04L 29/08* (2006.01)

(52) U.S. Cl.
CPC .......... *H04L 67/141* (2013.01); *H04L 67/143* (2013.01)

(58) Field of Classification Search
CPC .......................... H04L 67/141; H04L 67/143
See application file for complete search history.

(56) References Cited

U.S. PATENT DOCUMENTS

| 2013/0265990 | A1 | 10/2013 | Lee et al. |
| 2016/0112268 | A1 | 4/2016 | Chung et al. |

(Continued)

FOREIGN PATENT DOCUMENTS

| KR | 10-2014-0099982 A | 8/2014 |
| KR | 10-2015-0097254 A | 8/2015 |

(Continued)

OTHER PUBLICATIONS

International Search Report and Written Opinion of the International Searching Authority in connection with International Application No. PCT/KR2018/015837 dated Mar. 15, 2019, 11 pages.

*Primary Examiner* — Wing F Chan
*Assistant Examiner* — Joseph R Maniwang

(57) ABSTRACT

An electronic device according to various embodiments of the present invention comprises: a wireless communication circuit; a processor that is operatively connected to the wireless communication circuit; and a memory that is operatively connected to the processor, wherein the memory can store commands that allow the processor, when executed, to negotiate with a server about activation of a second session for registering the electronic device during a first session for registering the electronic device, to deactivate the first session, to activate the second session based on the negotiation result, to receive a message indicating a registration result of the electronic device from the server during the second session, and to output a notification indicating the registration result of the electronic device. Various embodiments are possible.

20 Claims, 11 Drawing Sheets

(56) References Cited

U.S. PATENT DOCUMENTS

| | | | |
|---|---|---|---|
| 2016/0162000 | A1 | 6/2016 | Fujiwara et al. |
| 2017/0127276 | A1 | 5/2017 | Koo et al. |
| 2017/0215023 | A1 | 7/2017 | Ly et al. |
| 2017/0244574 | A1 | 8/2017 | Moon et al. |
| 2018/0242129 | A1 | 8/2018 | Shah et al. |

FOREIGN PATENT DOCUMENTS

| | | |
|---|---|---|
| KR | 10-2016-0013175 A | 2/2016 |
| KR | 10-2016-0045504 A | 4/2016 |
| KR | 10-2016-0121775 A | 10/2016 |
| KR | 10-1688813 B1 | 12/2016 |
| KR | 10-2017-0033424 A | 3/2017 |
| KR | 10-2017-0046805 A | 5/2017 |
| KR | 10-2017-0097835 A | 8/2017 |

ELECTRONIC DEVICE FOR CONTROLLING REGISTRATION SESSION, AND OPERATION METHOD THEREFOR; AND SERVER, AND OPERATION METHOD THEREFOR

CROSS-REFERENCE TO RELATED APPLICATIONS

This application is a 371 National Stage of International Application No. PCT/KR2018/015837, filed Dec. 13, 2018, which claims priority to Korean Patent Application No. 10-2017-0172394, filed Dec. 14, 2017, the disclosures of which are herein incorporated by reference in their entirety.

BACKGROUND

1. Field

The disclosure relates to an electronic device for controlling a registration session with a server for registering the electronic device, a method of operating the same, a server, and a method of operating the same.

2. Description of Related Art

With the development of Internet-of-Things (IoT) technology for accessing the Internet through a sensor function and a communication function included in various items, various types of IoT devices providing various services have rapidly proliferated.

In order to control an IoT device, a user should perform a registration procedure of connecting the IoT device to an external device (for example, a server) to link with user account information. The external device may perform the procedure of registering the IoT device by receiving a registration request and user account information from the IoT device or a portable device of the user.

SUMMARY

An external device for registering an IoT device may receive a registration request including identification information of the IoT device from the IoT device, receive identification information and account information of the IoT device from a portable device of the user, and determine whether to register the IoT device on the basis of whether pieces of the received identification information are the same as each other.

However, the external device cannot specify the time point at which identification information and account information of the IoT device are received from the portable device of the user. Accordingly, the external device needs to maintain a registration session with the IoT device until the identification information and account information of the IoT device are received from the portable device of the user after receiving a registration request from the IoT device. This deteriorates the efficiency of use of server infrastructure.

Various embodiments of the disclosure may provide a method and an apparatus for increasing the efficiency of use of server infrastructure by allowing a server to terminate a session after determining only the validity of registration information of the IoT device without maintaining the session for a time spent waiting for mobile input to register the IoT device and allowing the device itself rather than the server to lead the overall registration process.

The IoT device and the server according to various embodiments of the disclosure do not need to maintain a registration session until authentication information for registration of the IoT device is received. Accordingly, an IoT service provider may provide IoT service without securing additional server infrastructure for maintaining a registration session until authentication information for registration of the IoT device is received.

In accordance with an aspect of the disclosure, an electronic device is provided. The electronic device includes: a wireless communication circuit; a processor operatively coupled to the wireless communication circuit, and a memory operatively coupled to the processor, wherein the memory stores instructions causing the processor to, when executed, negotiate activation of a second session for registration of the electronic device with a server during a first session for registration of the electronic device, deactivate the first session, activate the second session, based on a result of the negotiation, receive a message indicating the result of registration of the electronic device from the server during the second session, and output a notification indicating the result of registration of the electronic device.

In accordance with another aspect of the disclosure, a method of operating an electronic device is provided. The method includes: negotiating activation of a second session for registration of the electronic device with a server during a first session for registration of the electronic device; deactivating the first session; activating the second session, based on a result of the negotiation; receiving a message indicating the result of registration of the electronic device from the server during the second session; and outputting a notification indicating the result of the registration of the electronic device.

In accordance with another aspect of the disclosure, a method of operating a server is provided. The method includes: negotiating activation of a second session for registration of an electronic device with the server with the electronic device during a first session for registration of the electronic device; deactivating the first session; determining whether authentication information for registration of the electronic device is received from an external device; activating the second session, based on a result of the negotiation; and transmitting a message indicating the result of registration of the electronic device to the electronic device, based on whether the authentication information is received, during the second session.

The disclosure can increase the efficiency of use of server infrastructure by allowing a server to terminate a session after determining only the validity of registration information of the IoT device without maintaining the session during the time spent waiting for mobile input to register the IoT device, thus allowing the device itself rather than the server to lead the overall registration process. The IoT device and the server according to various embodiments of the disclosure do not need to maintain a registration session until authentication information for registration of the IoT device is received. Accordingly, an IoT service provider can provide IoT service without securing additional server infrastructure for maintaining a registration session until authentication information of the IoT device is received.

DETAILED DESCRIPTION

Figure 1:
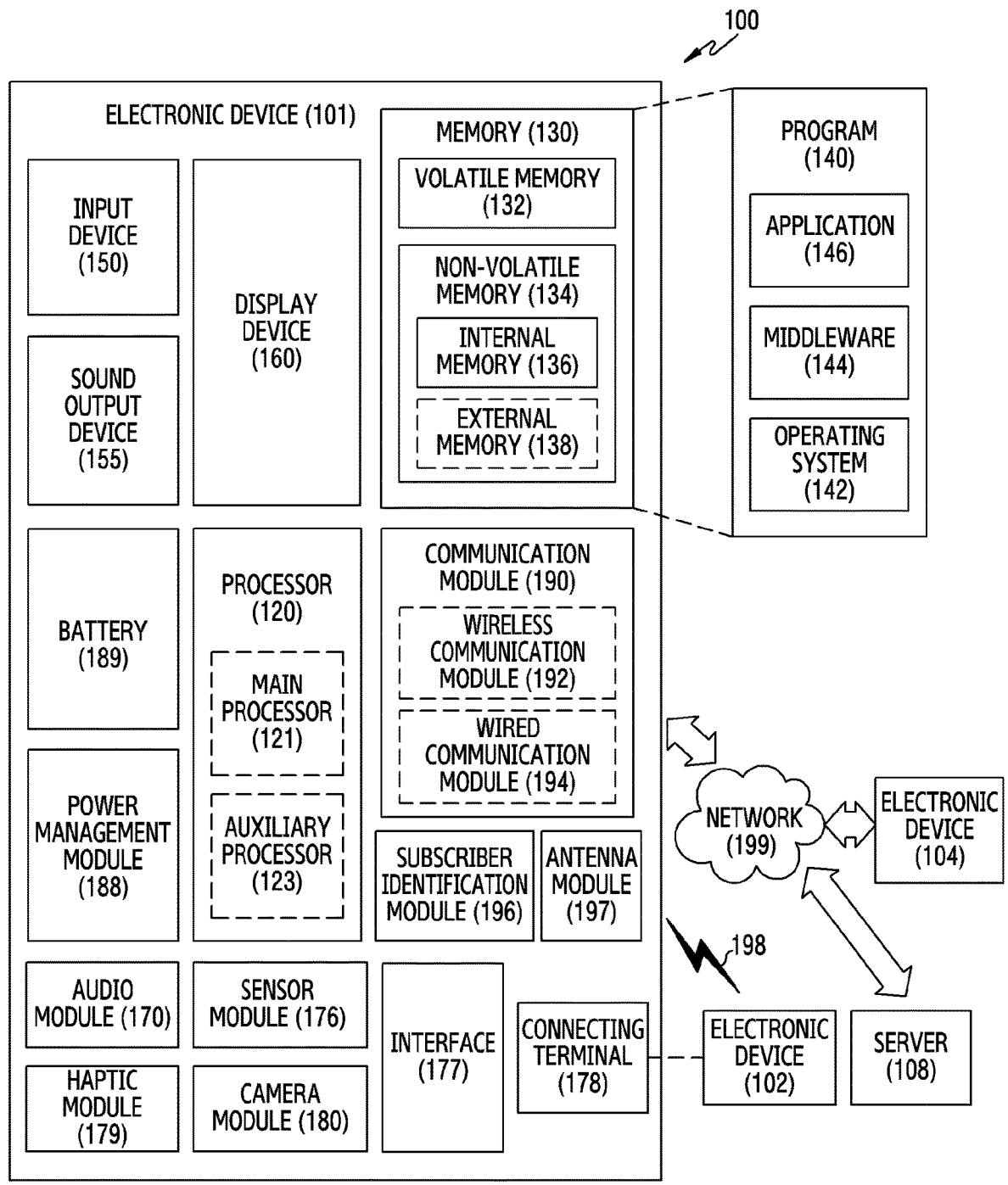
FIG. 1 is a block diagram of an electronic device within a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display)

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)). According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication module 190 may be implemented as a single chip, or may be implemented as multi chip separate from each other.

The wireless communication module 192 may identify and authenticate the electronic device 101 in a communication network using subscriber information stored in the subscriber identification module 196.

The antenna module 197 may include one or more antennas for transmitting a signal or power to the outside or receiving it from the outside. According to an embodiment, the communication module 190 (e.g., the wireless communication module 192) may transmit a signal to an external electronic device through an antenna suitable for a communication method, or receive a signal from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

(OS According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
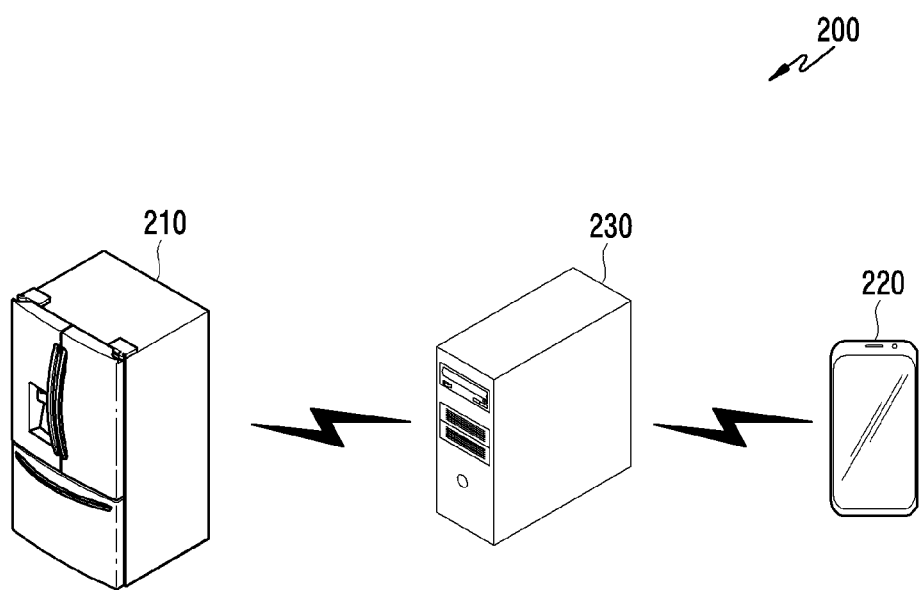
FIG. 2 illustrates a system according to various embodiments of the disclosure.

FIG. 2 illustrates a system 200 according to various embodiments of the disclosure. Referring to FIG. 2, the system 200 may be a system for registering a first electronic device 210. The system 200 may include the first electronic device 210, a second electronic device 220, and a server 230.

The first electronic device 210 may be an electronic device to be registered. The first electronic device 210 may be an electronic device which is not registered in the server 230. For example, the first electronic device 210 may be an electronic device in an out-of-box state.

According to an embodiment, registration of a specific electronic device in the server 230 may mean an operation of storing identification information (for example, MAC address information, a serial number, an LFDI, or an SFDI) of the specific electronic device in the memory (for example, a memory 130b of FIG. 3B) of the server 230.

According to another embodiment, registration of the specific electronic device in the server 230 may mean an operation of linking identification information of the specific electronic device with specific account information (for example, a user account of the specific electronic device) and storing the same in the memory 130b of the server 230. The specific account may be an account designated to one or more people. For example, the specific account may be an account designated to a family of the user.

According to an embodiment, the first electronic device 210 may transmit identification information of the first electronic device 210 to the server 230 in order to register the first electronic device 210. The first electronic device 210 may acquire identification information of the first electronic device 210 stored in a memory (for example, a memory 130a of FIG. 3A) of the first electronic device 210. For example, the first electronic device 210 may transmit the identification information of the first electronic device 210 to the server 230 in a registration session with the server 230 (or using a registration session with the server 230). The server 230 may deactivate the registration session and the identification information of the first electronic device 210 received from the first electronic device 210 in the registration session, and may then determine whether the first electronic device 210 is successfully registered (or completely registered) on the basis of authentication information received from the second electronic device 220. A detailed description thereof will be made below with reference to a description of the server 230.

According to an embodiment, the first electronic device 210 may be an IoT device. According to an embodiment, the first electronic device 210 may be the electronic device 101 of FIG. 1. For example, the first electronic device 210 may be home appliances such as an air conditioner, a TV, a light bulb, a refrigerator, or a boiler. In another example, the first electronic device 210 may be a dongle-type device connected to an external device in order to allow the external device to perform a specific function (for example, a wireless communication function). However, the above-described examples are only examples, and do not limit the scope of the disclosure.

The second electronic device 220 may be a device for registration of the first electronic device 210. According to an embodiment, the second electronic device 220 may be a device that transmits authentication information for registration of the first electronic device 210 to the server 230. For example, the second electronic device 220 may be a portable device (for example, a smartphone) used by the user of the first electronic device 210. The second electronic device 220 may be the electronic device 101 of FIG. 1.

According to an embodiment, the authentication information for registration of the first electronic device 210 may include information on an account to be linked with (or mapped to) identification information of the first electronic device 210 and stored in the server 230. For example, the second electronic device 220 may transmit user account information (for example, a user account ID or a user account password) of the first electronic device 210 to the server 230.

According to another embodiment, the authentication information for registration of the first electronic device 210 may include information for identifying the identification information of the first electronic device 210. For example, the second electronic device 220 may transmit the identification information of the first electronic device 210 to the server 230 in order to allow the server 230 to compare the identification information with the identification information received from the first electronic device 210.

According to another embodiment, the authentication information for registration of the first electronic device 210 may include both the user account information and the identification information of the first electronic device 210. For example, the second electronic device 220 may transmit the user account information of the first electronic device 210 and the identification information of the first electronic device 210 together to the server 230.

According to an embodiment, after the first electronic device 210 transmits the identification information of the first electronic device 210, the second electronic device 220 may transmit the authentication information for registration of the first electronic device 210. For example, the first electronic device 210 may transmit the identification information of the first electronic device 210 to the server 230 during the registration session. After the registration session is deactivated, the second electronic device 220 may transmit the authentication information for registration of the first electronic device 210.

The server 230 may be a device that determines whether the first electronic device 210 is successfully registered (or completely registered) and transmits a notification message to the first electronic device 210 or the second electronic device 220 on the basis of the determination of whether the registration is successful.

According to an embodiment, the server 230 may be simultaneously connected to a plurality of clients including the first electronic device 210. For example, the server 230 may be simultaneously connected to a plurality of clients through a plurality of registration sessions.

According to an embodiment, the server 230 may determine whether the first electronic device 210 is successfully registered using the identification information of the first electronic device 210 transmitted from the first electronic device 210 and the authentication information transmitted from the second electronic device 220. For example, the server 230 may receive the identification information of the first electronic device 210 from the first electronic device 210 in the registration session. After deactivating the registration session, the server 230 may receive the identification information of the first electronic device 210 and user account information from the second electronic device 220. The server 230 may determine whether the first electronic device 210 is successfully registered by comparing the identification information of the first electronic device 210 received from the first electronic device 210 with the identification information of the first electronic device 210 received from the second electronic device 220. When the identification information of the first electronic device 210 received from the first electronic device 210 is the same as the identification information of the first electronic device 210 received from the second electronic device 220, the server 230 may link the identification information of the first electronic device 210 with the user account information received from the second electronic device 220 and store the same in the memory (for example, the memory 130b of FIG. 3B). When the identification information of the first electronic device 210 received from the first electronic device 210 is not the same as the identification information of the first electronic device 210 received from the second electronic device 220, the server 230 may transmit a notification message indicating that registration of the first electronic device 210 has failed to at least one of the first electronic device 210 or the second electronic device 220.

According to an embodiment, the registration session may be a logical communication connection made between the first electronic device 210 and the server 230 in order to register the first electronic device 210 in the server 230. According to an embodiment, at least one of the first electronic device 210 and the server 230 may maintain activation of the registration session or deactivate (or end) the registration session through a Constrained Application Protocol (CoAP). For example, the first electronic device 210 may make a request for activating the registration session to the server 230 on the basis of the CoAP, and the server 230 may transmit a positive response indicating activation of the registration session on the basis of the CoAP.

According to an embodiment, the registration session may include two or more sessions. The registration session may include a first session and a second session, and the second session may be activated a predetermined amount of time after deactivation of the first session. The interval between deactivation of the first session and activation of the second session may be determined by the server 230 on the basis of negotiations between the first electronic device 210 and the second electronic device 220. For example, the first electronic device 210 may transmit negotiation information on activation of the second session (for example, information indicating when to activate the second session after the first session is deactivated) to the server 230 on the basis of the CoAP during the first session, and the server 230 may confirm information on activation of the second session on the basis of the received negotiation information and then transmit confirmed information on activation of the second session (hereinafter, referred to as "negotiation confirmation information on activation of the second session") to the first electronic device 210.

According to an embodiment, the negotiation information on activation of the second session that is transmitted from the first electronic device 210 to the server 230 may be information for negotiating, with the server 230, whether to activate the second session after the first session is deactivated and, if the second session is to be activated, when to activate the second session. According to an embodiment, the first electronic device 210 may determine negotiation information on activation of the second session on the basis of at least one piece of device information of the first electronic device 210 stored in the memory (for example, the memory 130*a* of FIG. 3A), information on the user of the first electronic device 210 stored in the memory, context information of the first electronic device 210, and input information of the first electronic device 210. For example, the first electronic device 210 may have a voice input of the user as a trigger event to initiate the procedure of registering the first electronic device 210, and may determine negotiation information on activation of the second session on the basis of a characteristic of the received voice input of the user (for example, a speed of speech or an acoustic characteristic such as a frequency).

According to an embodiment, the negotiation confirmation information on activation of the second session that is transmitted from the server 230 to the first electronic device 210 may be information indicating, to the first electronic device 210, whether to activate the second session after the first session is deactivated, and if the second session is to be activated, when to activate the second session after the first session is deactivated. The server 230 may determine the negotiation conformation information on the basis of the negotiation information received from the first electronic device 210. According to an embodiment, the server 230 may determine the negotiation conformation information of agreeing to or approving the negotiation information received from the first electronic device 210.

According to another embodiment, the server 230 may determine negotiation conformation information different from the negotiation information received from the first electronic device 210 on the basis of the device information of the first electronic device 210 stored in the memory (for example, the memory 130*b* of FIG. 3B) of the server 230 or the context information of the server 230. The context information of the server 230 may include information on one or more clients connected to the server 230. For example, the server 230 may receive negotiation information of negotiating whether to activate the second session three minutes after deactivation of the first session from the first electronic device 210. When the number of clients currently connected to the server 230 or the number of clients to be connected to the server 230 three minutes after deactivation of the first session is larger than a reference value, the server 230 may determine negotiation confirmation information indicating activation of the second session four minutes after deactivation of the first session and transmit the negotiation confirmation information to the first electronic device 210.

According to another embodiment, the server 230 may determine negotiation confirmation information different from the negotiation information received from the first electronic device 210 on the basis of pre-learned time data. According to an embodiment, the pre-learned time data may be data learned on the basis of information on a plurality of sessions activated between a plurality of clients that previously attempted registration in the server 230 and the server 230. For example, the server 230 may learn a tendency whereby the number of activated sessions changes over time on the basis of information on a plurality of previously activated sessions. The server 230 may determine negotiation confirmation information different from the negotiation information received from the first electronic device on the basis of data on the learned tendency. For example, the server 230 receiving negotiation information of negotiating activation of the second session three minutes after deactivation of the first session from the first electronic device 210 may determine negotiation confirmation information indicating activation of the second session four minutes after deactivation of the first session on the basis of data on the learned tendency.

Figure 3A:
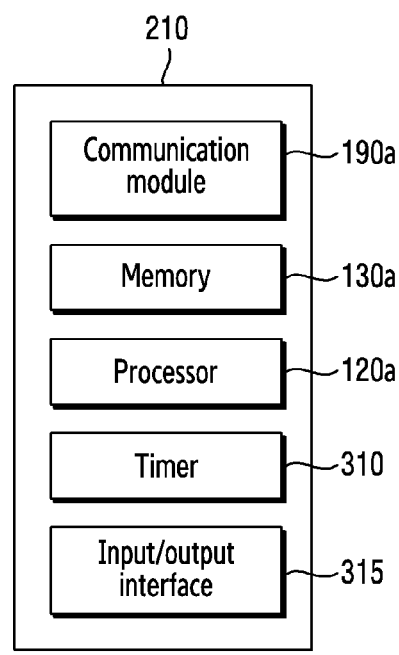
FIG. 3A illustrates the functional configuration of a first electronic device according to various embodiments of the disclosure.

FIG. 3A illustrates the functional configuration of the first electronic device 210 according to various embodiments of the disclosure.

Referring to FIG. 3A, the first electronic device 210 may include a communication module 190*a*, a memory 130*a*, a processor 120*a*, a timer 310, and an input/output interface 315. The communication module 190*a* may be the communication module 190 illustrated in FIG. 1. The memory 130*a* may be the memory 130 illustrated in FIG. 1. The processor 120*a* may be the processor 120 illustrated in FIG. 1.

The communication module 190*a* may exchange data between the first electronic device 210 and an external device (for example, the server 230 of FIG. 2) under the control of the processor 120*a*. For example, the processor 120*a* may control the communication module 190*a* to transmit a signal making a request for activating the first session to the server 230. In another example, the processor 120*a* may control the communication module 190*a* to transmit a request for registering the first electronic device 210 including identification information of the first electronic device 210 or negotiation information on activation of the second session to the server 230 during the first session.

According to an embodiment, the communication module 190*a* may include a wireless communication circuit.

The memory 130*a* may store data generated by the first electronic device 210 or data received from the outside (for example, the user) or an external device (for example, the server 230) under the control of the processor 120*a*.

For example, the processor 120*a* may control the memory 130*a* to store at least one piece of device information of the first electronic device 210, context information of the first electronic device 210, and operation log information of the first electronic device 210. The device information of the first electronic device 210 may include at least one piece of identification information of the first electronic device 210, hardware/software information of the first electronic device 210, and information on the standard supported by the first electronic device 210. The context information of the first electronic device 210 may include a speed of data exchange between the first electronic device 210 and the server 230 and information on whether the first electronic device 210 is currently registered in the server 230.

In another example, the processor 120*a* may control the memory 130*a* to store negotiation confirmation information on activation of the second session received from the server 230 during the first session.

According to an embodiment, the memory 130*a* may at least temporarily store data. For example, the processor 120*a* may semi-permanently store identification information of the first electronic device 210 before an update request is received from the user. In another example, the processor 120*a* may store negotiation conformation information on activation of the second session received from the server 230 during the first session only for a predetermined time.

The timer 310 may provide time information, required by the processor 120*a* for controlling the registration session, to the processor 120*a* under the control of the processor 120*a*.

According to an embodiment, the timer 310 may be activated or deactivated at a specific time point under the control of the processor 120*a*.

According to an embodiment, the timer 310 may maintain an activated state for a preset time. For example, when the processor 120a receives a user input (for example, a voice input) making a request for registering the first electronic device 210 in the server 230 to the user after detecting the non-registered state of the first electronic device 210, the processor 120a may activate the timer 310 for a preset time (for example, 15 minutes).

According to another embodiment, the timer 310 may periodically maintain an active state for a preset time. For example, the timer 310 may maintain the active state for 10 seconds at intervals of 5 minutes for a preset time of 15 minutes. The timer 310 may inform the processor 120a that a period of activating the timer 310 has arrived.

The processor 120a may control the overall operation of the first electronic device 210 for registering the first electronic device 210 in the server 230. For example, the processor 120a may determine data to be transmitted to an external device (for example, the server 230), or may determine an operation to be performed by the first electronic device 210 on the basis of the data received from the external device.

According to an embodiment, the processor 120a may activate the timer 310 for a preset time before activating the session with the server 230 for registration of the first electronic device 210. According to an embodiment, the timer 310 may be activated by the processor 120a detecting the non-registered state of the first electronic device 210 (for example, out-of-box state). For example, the processor 120a may search the memory 130a to check whether there is no history of previous registration of the first electronic device 210 in the server 230 or whether the registration history in the server 230 was subsequently reset, so as to detect the non-registered state of the first electronic device 210. The timer 310 may detect the non-registered state of the first electronic device 210, and may be activated by the processor 120a detecting subsequent user input. For example, the processor 120a detecting the non-registered state of the first electronic device 210 may query the user as to whether to perform the procedure of registering the first electronic device 210 and activate the timer 310 in response to reception of a positive response (or input) from the user.

According to an embodiment, the processor 120a may activate the first session with the server 230 for registering the first electronic device 210 on the basis of information on the timer 310. For example, when the timer 310 has not yet expired (when the timer 310 is in an active state), the processor 120a may make a request for activating the first session for registration of the electronic device 300 to the server 230. The processor 120a may transmit a signal making a request for activating the first session to the server 230 on the basis of the CoAP. The processor 120a may activate the first session with the server 230 by receiving a positive response to the signal making the request for activating the first session from the server 230.

According to an embodiment, the processor 120a may transmit a signal making a request for registering the first electronic device 210 to the server 230 during the first session. The signal making the request for registering the first electronic device 210 may include identification information of the first electronic device 210. The signal making the request for registering the first electronic device 210 may or may not include negotiation information on activation of a second session. For example, after transmitting the signal making the request for registering the first electronic device 210, the first electronic device 210 may transmit negotiation information on activation of the second session. The second session may be a registration session activated between the first electronic device 210 and the server 230 a predetermined amount of time after deactivation of the first session. Negotiation information on activation of the second session may be information for negotiating, with the server 230, whether to activate the second session after deactivation of the first session, and, if the second session is activated, when to activate the second session. The negotiation information on activation of the second session may include one piece of last-try information indicating non-activation of the second session after deactivation of the first session and continuance information indicating activation of the second session after deactivation of the first session. The continuance information may include information for negotiating when to activate the second session after deactivation of the first session with the server 230. For example, the continuance information may include information for negotiating activation of the second session five minutes after deactivation of the first session with the server 230.

According to an embodiment, the processor 120a may determine negotiation information on activation of the second session on the basis of information on the timer 310. The processor 120a may determine negotiation information on activation of the second session including last-try information on the basis of information on the timer 310. For example, the processor 120a may determine negotiation information on activation of the second session including last-try information in response to identification that the timer 310 is currently in an inactive state. In another example, the processor 120a may determine negotiation information on activation of the second session including continuance information in response to identification that the timer 310 is currently in an active state.

The input/output interface 315 may receive user input in various forms for the first electronic device 210, or may output a notification or a message in various forms under the control of the processor 120a. According to an embodiment, the input/output interface 315 may be at least one of the input device 150, the sound output device 155, and/or the display device 160 illustrated in FIG. 1. For example, when the first electronic device 210 receives a registration completion message during the second session with the server 230, the processor 120a may control the input/output interface 315 to output a voice message stating "registration has been completed normally".

Figure 3B:
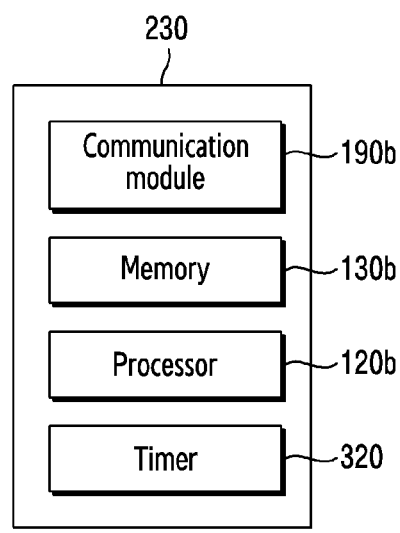
FIG. 3B illustrates the functional configuration of a server according to various embodiments of the disclosure.

FIG. 3B illustrates the functional configuration of the server 230 according to various embodiments of the disclosure.

Referring to FIG. 3B, the server 230 may include a communication module 190b, a memory 130b, a processor 120b, and a timer 320. The communication module 190b may be the communication module 190 illustrated in FIG. 1. The memory 130b may be the memory 130 illustrated in FIG. 1. The processor 120b may be the processor 120 illustrated in FIG. 1.

The communication module 190b may exchange data between the server 230 and an external device (for example, the first electronic device 210 or the second electronic device 220 of FIG. 2) under the control of the processor 120b.

According to an embodiment, the communication module 190b may include a wireless communication circuit.

The memory 130b may store data generated by the server 230 or data received from the external device under the control of the processor 120b.

For example, when a request for registering the first electronic device including identification information of the first electronic device 210 is received from the first electronic device 210, the processor 120*b* may control the memory 130*b* to store the identification information of the first electronic device 210.

In another example, the processor 120*b* may receive the request for registering the first electronic device 210 including the identification information of the first electronic device 210 from the first electronic device 210 and receive identification information of the first electronic device and user account information from the second electronic device 220. When the pieces of the received identification information of the first electronic device are the same as each other, the processor 120*b* may control the memory 130*b* to link the identification information of the first electronic device 210 with the received user account information and store the same.

The timer 320 may manage one or more registration sessions for one or more clients (for example, the first electronic device 210) connected to the server 230. The timer 320 may manage the time point at which one or more registration sessions corresponding to a specific time interval (or activated in at least some of a specific time interval) are activated and an activation maintenance time. According to an embodiment, the timer 320 may provide information on registration sessions (for example, the number of registration sessions) corresponding to a specific time interval to the processor 120*b* in response to the request from the processor 120*b*.

The processor 120*b* may control the overall operation of the server 230 for registering the first electronic device 210 in the server 230. For example, the processor 120*b* may determine data to be transmitted to the external device (for example, the first electronic device 210), or may determine an operation to be performed by the server 230 on the basis of the data received from the external device.

According to an embodiment, the processor 210*b* may receive a request for registering the first electronic device 210 including identification information of the first electronic device 210 from the first electronic device during the first session.

According to an embodiment, the processor 120*b* may negotiate activation of the second session with the first electronic device 210 during the first session. The processor 120*b* may receive negotiation information on activation of the second session from the first electronic device 210 during the first session. The processor 120*b* may confirm information on activation of the second session on the basis of the received negotiation information on activation of the second session and transmit negotiation confirmation information on activation of the second session to the first electronic device 210. The processor 120*b* may confirm the information on activation of the second session by approving the negotiation information on activation of the second session, and may change some of the negotiation information on activation of the second session so as to confirm information on activation of the second session. For example, the processor 120*b* may confirm information on activation of the second session on the basis of information on the timer 320. For example, when the number of clients currently connected to the server 230 is larger than a reference value, the server 230 may change some of the negotiation information on activation of the second session and thus confirm negotiation confirmation information on activation of the second session.

According to an embodiment, when activation of the second session is confirmed a predetermined amount of time after deactivation of the first session, the processor 120*b* may identify whether authentication information for registration of the first electronic device 210 is transmitted from the second electronic device 220 before the second session is activated after deactivation of the first session. The authentication information may include identification information of the first electronic device and information on an account to be registered. When authentication information is not transmitted from the second electronic device 220, the processor 120*b* may activate the second session and repeat the operations performed during the first session. When the authentication information is received from the second electronic device 220, the processor 120*b* may compare the identification information received from the first electronic device 210 with the identification information received from the second electronic device 220 and determine whether the first electronic device 210 is successfully registered on the basis of the comparison result. For example, when the identification information received from the first electronic device 210 is the same as the identification information received from the second electronic device 220, the processor 120*b* may control the memory 130*b* to link the identification information of the first electronic device 210 with the account information received from the second electronic device 220 and store the same.

According to an embodiment, when non-activation of the second session is confirmed after deactivation of the first session, the processor 120*b* may identify whether authentication information for registration of the first electronic device 210 is transmitted from the second electronic device 220 before deactivation of the first session. When the authentication information is transmitted from the second electronic device 220, the processor 120*b* may determine whether the first electronic device 210 is successfully registered on the basis of the result of a comparison between the identification information received from the first electronic device 210 and the identification information received from the second electronic device 220. When the authentication information is not transmitted from the second electronic device 220, the processor 120*b* may finally determine that registration of the first electronic device 210 has failed, and may transmit a relevant message to at least one of the first electronic device 210 or the second electronic device 220.

An electronic device (for example, the electronic device 101 or the first electronic device 210) according to various embodiments of the disclosure may include a wireless communication circuit (for example, the communication module 190*b*), a processor (for example, the processor 120*a*) operatively coupled to the wireless communication circuit, and a memory (for example, the memory 130*a*) operatively coupled to the processor, wherein the memory may store instructions causing the processor to, when executed, negotiate activation of a second session for registration of the electronic device with a server (for example, the server 230) during a first session for registration of the electronic device, deactivate the first session, activate the second session, based on a result of the negotiation, receive a message indicating the result of registration of the electronic device from the server during the second session, and output a notification indicating the result of registration of the electronic device.

According to various embodiments, the instructions may cause the processor to transmit a registration request including identification of the electronic device to the server during the first session.

According to various embodiments, the electronic device may further include a timer (for example, the timer 310) operatively coupled to the processor, wherein the instructions may cause the processor to activate the timer for a preset time and negotiate activation of the second session with the server, based on information on the timer.

According to various embodiments, the instructions may cause the processor to transmit negotiation information on activation of the second session to the server and receive negotiation confirmation information on activation of the second session from the server during the first session.

According to various embodiments, the instructions may cause the processor to transmit the negotiation information on activation of the second session to the server in response to identification of the activated state of the timer.

According to various embodiments, the negotiation information on activation of the second session may include information on at least one of the time point at which the second session is activated or the time during which activation of the second session is maintained.

According to various embodiments, when the server receives authentication information for registration of the electronic device from an external electronic device after deactivation of the first session, the message indicating the result of registration of the electronic device may be a message indicating successful completion of registration of the electronic device.

According to various embodiments, the negotiation confirmation information on activation of the second session may be information having at least some changes from the negotiation information on activation of the second session.

According to various embodiments, the negotiation confirmation information on activation of the second session may be determined according to data learned based on information on a plurality of sessions related to a plurality of clients having attempted registration in the server.

According to various embodiments, the instructions may cause the processor to negotiate activation of the second session with the server through a Constrained Application Protocol (CoAP) during the first session.

Figure 4:
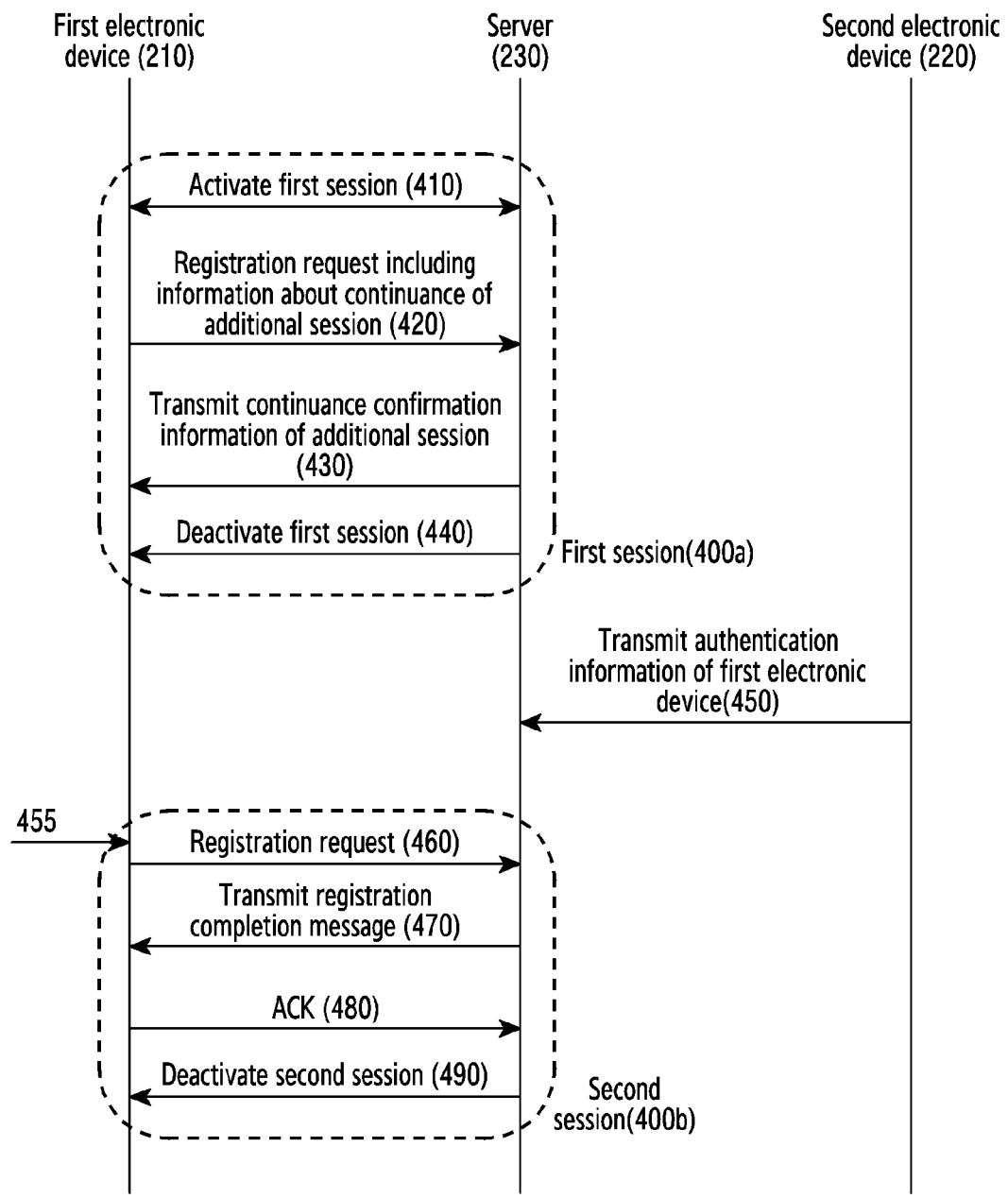
FIG. 4 illustrates signaling between a first electronic device, a server, and a second electronic device according to various embodiments of the disclosure.

FIG. 4 illustrates signaling between a first electronic device, a server, and a second electronic device according to various embodiments of the disclosure.

For example, the first electronic device may be the first electronic device 210 illustrated in FIG. 2, the second electronic device may be the second electronic device 220 illustrated in FIG. 2, and the server may be the server 230 illustrated in FIG. 2.

In operation 410, the first electronic device 210 and the server 230 may activate a registration session (for example, a first session 400a) for registering the first electronic device 210 in the server 230. For example, the first electronic device 210 may transfer a signal making a request for activating the first session 400a to the server 230 through the CoAP. The server 230, receiving the signal making the request for activating the first session 400a from the first electronic device 210, may transmit a positive response to activation of the first session 400a so as to activate the first session 400a. In another example, when the server 230 transmits the signal making the request for activating the first session 400a to the first electronic device 210 and the first electronic device 210 transmits the positive response to the server 230, the first session 400a may be activated.

According to an embodiment, the first electronic device 210 may additionally transmit information on the time during which the first session 400a remains in the active state to the server 230.

In operation 420, the first electronic device 210 may transmit a request for registering the first electronic device 210, including information about continuance of an additional session, to the server 230. The first electronic device 210 may transmit the request for registering the first electronic device 210 to the server 230 using the first session 400a.

According to an embodiment, the first electronic device 210 may transmit information about continuance of the additional session after transmitting the request for registering the first electronic device 210 to the server 230 or vice versa.

According to an embodiment, the request for registering the first electronic device 210 may be a signal (or message) making a request for registering the first electronic device 210 in the server 230. According to an embodiment, the request for registering the first electronic device 210 may include identification information of the first electronic device 210 (for example, a MAC address, a serial number, an LFDI, or an SFDI). For example, the identification information of the first electronic device 210 may be a character string including model information, a serial number, an LFDI, or an SFDI of the first electronic device 210. In the identification information, the model information, the serial number, the LFDI, or the SFDI may be distinguished by a delimiter (for example, a period).

According to an embodiment, the server 230 may store the identification information of the first electronic device 210 included in the request for registering the first electronic device 210 to the memory (for example, the memory 130b of FIG. 3B) of the server 230.

According to an embodiment, the additional session may be a registration session activated again between the first electronic device 210 and the sever 230 after the first session 400a between the first electronic device 210 and the server 230 is deactivated. There may be no other registration session between the first session and the additional session. For example, the additional session may be a second session 400b.

According to an embodiment, information about continuance of the additional session may be information indicating activation of the additional session a predetermined amount of time after deactivation of the first session. In other words, the information about continuance of the additional session may be information indicating that the first session is not the last session for registration of the first electronic device 210.

According to an embodiment, the first electronic device 210 may transmit a registration request including the information about continuance of the additional session to the server 230 on the basis of information on the timer 310. For example, the first electronic device 210 may activate the timer 310 before operation 410. When the timer 310 has not yet expired (when the timer 310 is in the active state), the first electronic device 210 may transmit the registration request including the information about continuance of the additional session to the server 230.

According to an embodiment, the information about continuance of the additional session may include information on activation of the additional session. The information on activation of the additional session may be information indicating when to activate the additional session or how long the active state of the additional session is maintained. For example, the information about continuance of the additional session may be information indicating activation of the additional session for three minutes, five minutes after deactivation of the first session 400a.

According to an embodiment, the information about continuance of the additional session may be information for negotiating activation of the additional session with the server 230. The server 230 may confirm the information related to activation of the additional session on the basis of the information about continuance of the additional session received from the first electronic device 210. For example, the server 230 may confirm the information related to activation of the additional session by agreeing to or approving negotiation information on activation of the additional session received from the first electronic device 210. In another example, the server 230 may confirm the information on activation of the additional session by changing some of the information on activation of the additional session received from the first electronic device 210. For example, when the information on activation of the additional session received from the first electronic device 210 is information indicating activation of the additional session for three minutes, five minutes after deactivation of the first session, the server 230 may confirm the information on activation of the additional session to activate the additional session for three minutes, four minutes after deactivation of the first session.

According to an embodiment, the request for registering the first electronic device 210 may include the identification information of the first electronic device 210 and the information about continuance of the additional session. For example, when the identification information of the first electronic device 210 is a character string including model information, a serial number, an LFDI, or an SFDI of the first electronic device 210, the first electronic device 210 may add a character (for example, R) or a character string indicating continuance of the additional session to the identification information of the first electronic device 210.

According to an embodiment, the server 230 may at least temporarily store information received from the first electronic device 210 in the memory 130*b*. For example, the server 230 may store at least one piece of the identification information of the first electronic device 210 of which registration is requested, session information (the first session 400*a*) used for the registration request, and the information about continuance of the additional session included in the registration request in the memory 130*b*.

In operation 430, the first electronic device 210 may receive continuance confirmation information of the additional session from the server 230.

According to an embodiment, the continuance confirmation information of the additional session may be information related to activation of the additional session confirmed by the server 230 using the information about continuance of the additional session. For example, when the first electronic device 210 transmits, to the server 230, information indicating activation of the additional session for three minutes, five minutes after deactivation of the first session 400*a*, the server 230 may transmit continuance confirmation information of the additional session indicating activation of the additional session for three minutes, four minutes after deactivation of the first session 400*a*, to the first electronic device 210. The continuance confirmation information of the additional session may be a CoAP 231 continue response.

According to an embodiment, the server 230 may complete negotiations for activation of the additional session with the first electronic device 210 by transmitting the continuance confirmation information of the additional session to the first electronic device 210.

Although not illustrated, the information on activation of the additional session may be confirmed by the first electronic device 210 rather than the server 230. For example, the first electronic device 210, receiving the information on activation of the additional session from the server 230, may confirm the information on activation of the additional session by agreeing to or approving the received information or changing some of the received information.

According to an embodiment, the server 230 may transmit information on deactivation of the first session along with the continuance confirmation information of the additional session. For example, the server 230 may transmit information on the time point at which the first session is deactivated.

According to an embodiment, the server 230 may store at least one piece of information on activation of the additional session or information on deactivation of the first session in the memory 130*b*. For example, the server 230 may store at least one piece of confirmed information on activation of the additional session (for example, information indicating when to activate the additional session or how long the additional session is activated) and information on deactivation of the first session (for example, information indicating when to deactivate the first session) in the memory 130*b*.

According to an embodiment, the server 230 may verify whether the identification information of the first electronic device 210 included in the request for registering the first electronic device is valid before transmitting the continuance confirmation information of the additional session to the first electronic device 210. For example, when the identification information of the first electronic device 210 included in the request for registering the first electronic device does not have a predetermined format (for example, the case in which the received identification information is a 9-digit character even though the predetermined format is a 10-digit character) or when the identification information of the first electronic device 210 does not match any entry in an identification information list stored in the memory 130*b*, the server 230 may determine that the identification information of the first electronic device 210 is not valid. The server 230 may transmit the continuance confirmation information of the additional session only when the identification information of the first electronic device 210 is valid. When the identification information of the first electronic device 230 is not valid, the server 230 may not transmit the continuance confirmation information of the additional session, but may transmit a message indicating that the remainder of the registration procedure is not to be performed because the identification information is not valid to the first electronic device 210. For example, the message indicating that the remainder of the registration procedure is not to be performed because the identification information is not valid may be a CoAP 400 bad request response.

In operation 440, the first electronic device 210 or the server 230 may deactivate the first session 400*a*. For example, the first electronic device 210 may deactivate the first session n400*a* by deleting the value of a parameter (for example, a session ID) related to the first session 400*a*. In another example, the first electronic device 210 may deactivate the first session 400*a* after making a request for deleting the value of the parameter related to the first session 400*a* to the server 230.

According to an embodiment, at least one device among the first electronic device 210 or the server 230 may at least temporarily store information on the time point at which the first session 400*a* is deactivated in the memory (for example, the memory 130*a* of the first electronic device or the memory 130*b* of the server).

According to an embodiment, the server 230 may simultaneously perform operation 430 for transmitting the continuance confirmation information of the additional session and operation 440 for deactivating the first session. For example, the first electronic device 210 may simultaneously receive the continuance confirmation information of the additional session and information about deactivation of the first session in response to the registration request including the information about continuance of the additional session.

In operation 450, the second electronic device 220 may transmit authentication information of the first electronic device 210 to the server 230. For example, the second electronic device 220 may transmit authentication information for registration of the first electronic device 210 to the server 230.

According to an embodiment, the authentication information for registration of the first electronic device 210 may be information on an account to be linked with the identification information of the first electronic device 210 and stored. For example, the second electronic device 220 may transmit account information of the user of the first electronic device 210 (for example, a user account ID or a user account password) to the server 230.

According to another embodiment, the authentication information for registration of the first electronic device 210 may be information for identifying the identification information of the first electronic device 210. For example, the second electronic device 220 may transmit the identification information of the first electronic device 210 to the server 230 in order to allow the server 230 to compare the identification information with the identification information received from the first electronic device 210 during the first session 400a (for example, the identification information received in operation 420).

According to an embodiment, the server 230 may determine whether the authentication information of the first electronic device 210 is received from the second electronic device 220. For example, the server 230 may determine whether the authentication information of the first electronic device 210 is received from the second electronic device 220 until the time point at which the additional session (for example, the second session 400b) is activated arrives after the time point at which the first session 400a is deactivated passes. The time point at which the additional session is activated may be negotiated in advance with the first electronic device 210 in the first session 400a.

According to an embodiment, the server 230 may determine whether the first electronic device 210 is successfully registered on the basis of the authentication information of the first electronic device 210 received from the second electronic device 220. For example, when the identification information of the first electronic device 210 stored in the memory 130b is the same as the identification information of the first electronic device 210 received from the second electronic device 220, the server 230 may determine that the first electronic device 210 has been successfully registered, and may register the first electronic device 210 to be linked with the account information received from the second electronic device 220. In another example, when the identification information of the first electronic device 210 stored in the memory 130b is different from the identification information of the first electronic device 210 received from the second electronic device 220, the server 230 may determine that registration of the first electronic device 210 has failed. In another example, when the user account information is not authenticated (for example, when the account ID and account password do not match) although the identification information of the first electronic device 210 stored in the memory 130b is the same as the identification information of the first electronic device 210 received from the second electronic device 220, the server 230 may determine that registration of the first electronic device 210 has failed.

In operation 455, the first electronic device 210 may identify whether the additional session (for example, the second session 400b) is activated. For example, the first electronic device 210 may identify whether the time point at which the second session 400b is activated has arrived. The first electronic device 210 may periodically identify whether the second session 400b is activated.

According to an embodiment, the first electronic device 210 may identify whether the time point at which the second session 400b is activated arrives on the basis of the continuance confirmation information of the additional session received in operation 430.

When it is identified that the second session 400b is activated, the first electronic device 210 may transmit a request for registering the first electronic device 210 to the server 230 using the second session 400b in operation 460. The request for registering the first electronic device 210 may include identification information of the first electronic device 210. The request for registering the first electronic device 210 may include negotiation information on an additional session (for example, a third session (not shown)).

In operation 470, the first electronic device 210 may receive a registration completion message from the server 230. The server 230 may determine whether the first electronic device 210 has been successfully registered on the basis of the authentication information of the first electronic device 210 received from the second electronic device 220 before activation of the second session 400 after the first session 400a is deactivated. According to an embodiment, when registration of the first electronic device 210 is successful, the server 230 may transmit a registration completion message to the first electronic device 210. For example, the registration completion message may be a CoAP 201 created response.

In operation 480, the first electronic device 210 may transmit an ACK message to the server 230 in response to the registration completion message received in operation 470.

In operation 490, at least one device among the first electronic device 210 or the server 230 may deactivate the second session 400b. For example, the first electronic device 210 may deactivate the second session 400b by deleting the value of a parameter related to the second session 400b (for example, a session ID).

According to an embodiment, the first electronic device 210 may deactivate the second session 400b without any negotiation for activation of an additional session (for example, a third session (not shown)) with the server 230.

According to an embodiment illustrated in FIG. 4, the server 230 does not need to maintain the first session 400a until reception of the authentication information for registration of the first electronic device 210 from the second electronic device 220 after receiving the request for registering the first electronic device 210 using the first session 400a. The server 230 may increase the efficiency of use of the infrastructure of the server 230 by deactivating an unnecessarily maintained session during a process of registering an IoT device (for example, the first electronic device 210) through negotiations with the first electronic device 210.

Figure 5:
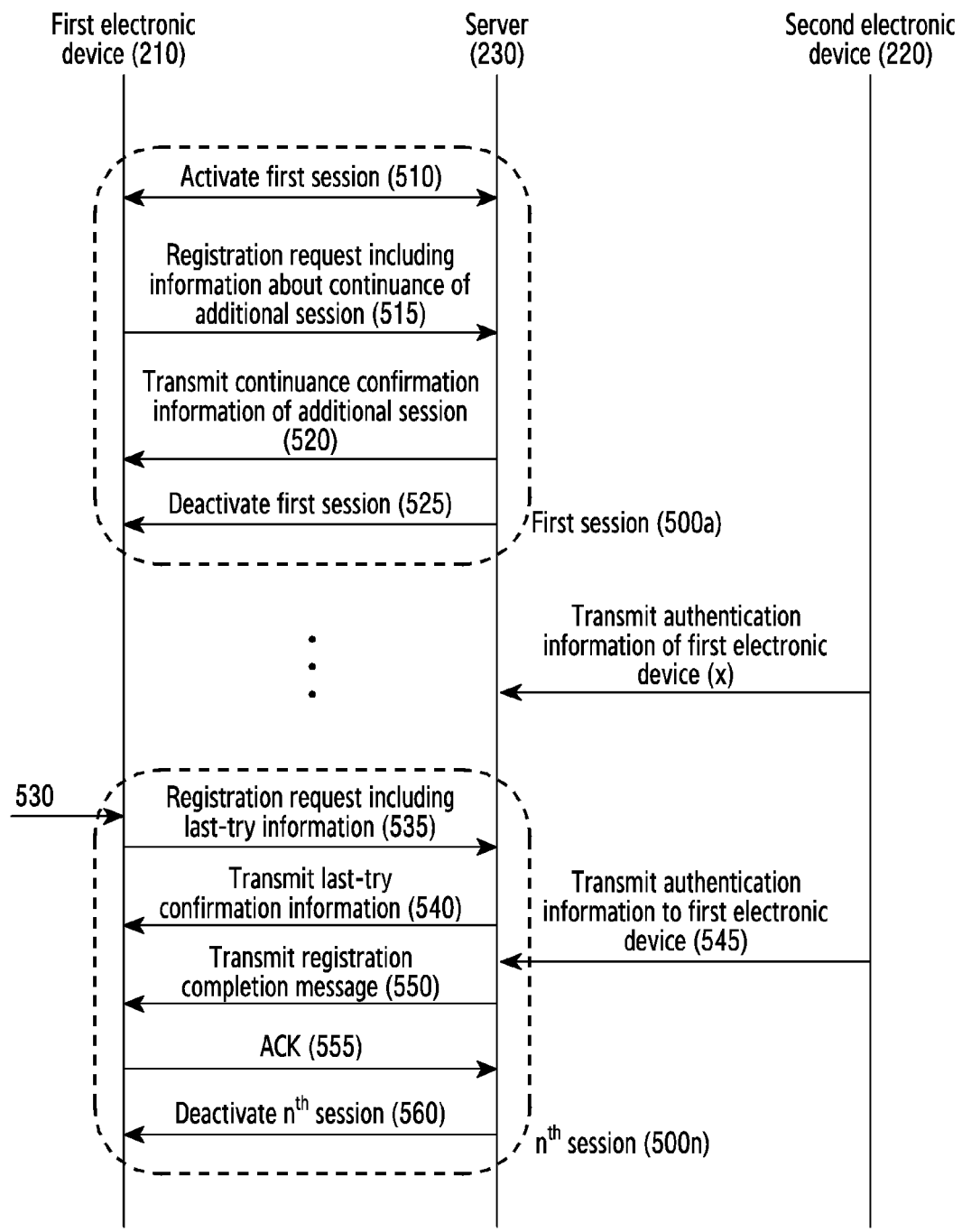
FIG. 5 illustrates signaling between a first electronic device, a server, and a second electronic device according to various embodiments of the disclosure.

FIG. 5 illustrates signaling between a first electronic device, a server, and a second electronic device according to various embodiments of the disclosure.

The first electronic device may be the first electronic device 210 illustrated in FIG. 2, the second electronic device may be the second electronic device 220 illustrated in FIG. 2, and the server may be the server 230 illustrated in FIG. 2.

Since operations 510 to 525 are the same as operations 410 to 440 illustrated in FIG. 4, a detailed description thereof will be omitted.

After a first session 500a is deactivated, the server 230 may determine whether authentication information of the first electronic device 210 is received from another electronic device (for example, the second electronic device 220) until the time point at which an additional session (for example, a second session (not shown)) is activated, negotiated with the first electronic device 210, arrives. The time point at which the additional session is activated may be negotiated in advance with the first electronic device 210 in the first session 400a.

Unlike what is shown in FIG. 4, the server 230 may not receive authentication information of the first electronic device 210 from the second electronic device 220 until the time point at which the additional session (for example, the second session (not shown)) is activated arrives after the first session 500a is deactivated in FIG. 5.

According to an embodiment, when authentication information of the first electronic device 210 is not received from the second electronic device 220 until the time point at which the additional session (for example, the second session (not shown)) is activated arrives after the first session 500a is deactivated, the first electronic device 210 and the server 230 may repeatedly perform the operation, performed in the first session 500a, in the additional session (for example, the second session (not shown)). The first electronic device 210 and the server 230 may repeatedly perform the operation, performed in the first session 500a, in a plurality of additional sessions for a predetermined time (for example, the time for which the timer 310 of the first electronic device 210 is activated). The first electronic device 210 may repeatedly perform the operation, performed in the first session 500a, in a plurality of additional sessions until a registration completion message is received from the server 230 for a predetermined time. For example, when the time point at which the additional session (for example, the second session (not shown) is activated arrives, the first electronic device 210 may transmit a request for registering the first electronic device 210 to the server 230 using the additional session (for example, the second session (not shown)). When the registration completion message is not transmitted from the server 230 during the additional session (for example, the second session (not shown)), the first electronic device 210 may negotiate activation of an additional session (for example, a third session (not shown)) of the additional session (for example, the second session (not shown)) with the server 230 and deactivate the additional session (for example, the second session (not shown)).

According to an embodiment, the first electronic device 210 may transmit the request for registering the first electronic device 210 including last-try information to the server 230 when the registration completion message is not received from the server 230 until a predetermined time passes. At this time, a registration session may be referred to as an $n^{th}$ session 500n. According to an embodiment, the last-try information may be negotiation information indicating non-activation of the additional session after deactivation of the current session (that is, the $n^{th}$ session 500n). In FIG. 5, sessions (for example, second and third sessions) between the first session 500a and the $n^{th}$ session 500n are omitted, and the $n^{th}$ session 500n will be mainly described below.

In operation 530, the first electronic device 210 may identify whether the time point at which the $n^{th}$ session 500n is activated arrives after an $(n-1)^{th}$ session (not shown) is deactivated. According to an embodiment, the first electronic device 210 may pre-negotiate the time point at which the $n^{th}$ session 500n is activated with the server 230 in the $(n-1)^{th}$ session (not shown).

When it is identified that the time point at which the $n^{th}$ session 500n is activated arrives, the first electronic device 210 may transmit a registration request including last-try information to the server 230 in operation 535. The last-try information may be negotiation information indicating non-activation of the additional session after the $n^{th}$ session 500n is deactivated.

According to an embodiment, the request for registering the first electronic device 210 may include identification information of the first electronic device 210 and last-try information indicating non-activation of the additional session. For example, when the identification information of the first electronic device 210 is a character string including model information, a serial number, an LFDI, or an SFDI of the first electronic device 210, the first electronic device 210 may add a character (for example, d) or a character string indicating non-activation of the additional session to the identification information of the first electronic device 210.

According to an embodiment, the first electronic device 210 may transmit the registration request including the last-try information to the server 230 on the basis of information on the timer 310. For example, the first electronic device 210 may activate the timer 310 before operation 510. When the timer 310 has expired (when the timer 310 is deactivated), the first electronic device 210 may transmit the registration request including last-try information to the server 230.

In operation 540, the server 230 may transmit the last-try confirmation information to the first electronic device 210. According to an embodiment, the server 230 may transmit last-try confirmation information for agreeing to or approving the last-try information received from the first electronic device 210 to the first electronic device 210.

According to an embodiment, the server 230 may complete negotiations for deactivation of the additional session with the first electronic device 210 by transmitting the last-try confirmation information to the first electronic device 210. In other words, the server 230 may complete negotiations with the first electronic device 210 so as not to activate the additional session.

According to an embodiment, the server 230 may transmit information about deactivation of the $n^{th}$ session 500n along with the last-try confirmation information. For example, the server 230 may transmit information on the time point at which the $n^{th}$ session 500n is deactivated.

In operation 545, the server 230 may receive authentication information of the first electronic device 210 from the second electronic device 220 in the current session.

According to an embodiment, the server 230 may periodically identify whether the authentication information of the first electronic device 210 is received from the second electronic device 220 in the current session. For example, the server 230 may identify whether the authentication information of the first electronic device 210 is received from the second electronic device 220 during at least some intervals in which activation of the $n^{th}$ session 500n is maintained. For example, the server 230 may identify whether the authentication information of the first electronic device 210 is received from the second electronic device 220 during initial intervals of 90% of all intervals in which activation of the $n^{th}$ session 500n is maintained. Since the server 230 completes negotiations with the first electronic device 210 so as not to activate the additional session after the $n^{th}$ session 500n is deactivated, the server 230 may identify whether the authentication information of the first electronic device 210 is received from the second electronic device 220 only during at least some intervals in which activation of the $n^{th}$ session 500n is maintained.

In operation 550, the server 230 may transmit a registration completion message to the first electronic device 210 on the basis of the authentication information of the first electronic device 210 received from the second electronic device 220 in operation 545. For example, when the identification information of the first electronic device 210 received from the first electronic device 210 is the same as the identification information of the first electronic device 210 received from the second electronic device 220, the server 230 may transmit the registration completion message to the first electronic device 210.

In operation 555, the first electronic device 210 may transmit an ACK message to the server 230 in response to the registration completion message received in operation 550.

In operation 560, at least one device among the first electronic device 210 or the server 230 may deactivate the $n^{th}$ session 500n. For example, the server 230 may deactivate the $n^{th}$ session 500n by deleting the value of a parameter related to the $n^{th}$ session 500n.

Although not illustrated, the server 230 may identify whether the authentication information of the first electronic device 210 is received from the second electronic device 220 before the $n^{th}$ session 500n is activated. For example, the server 230 may identify whether the authentication information of the first electronic device 210 is received from the second electronic device 220 before activation of the $n^{th}$ session 500n after deactivation of the $(n-1)^t$ session (not shown).

According to an embodiment, the server 230 may receive the authentication information of the first electronic device 210 from the second electronic device 220 before receiving the request including the last-try information from the first electronic device 210. In this case, the server 230 may simultaneously perform operation 540 for transmitting last-try confirmation information and operation 550 for transmitting the registration completion message, or may not perform operation 540 for transmitting the last-try confirmation information after receiving the registration request including last-request information from the first electronic device 210 in operation 535.

Figure 6:
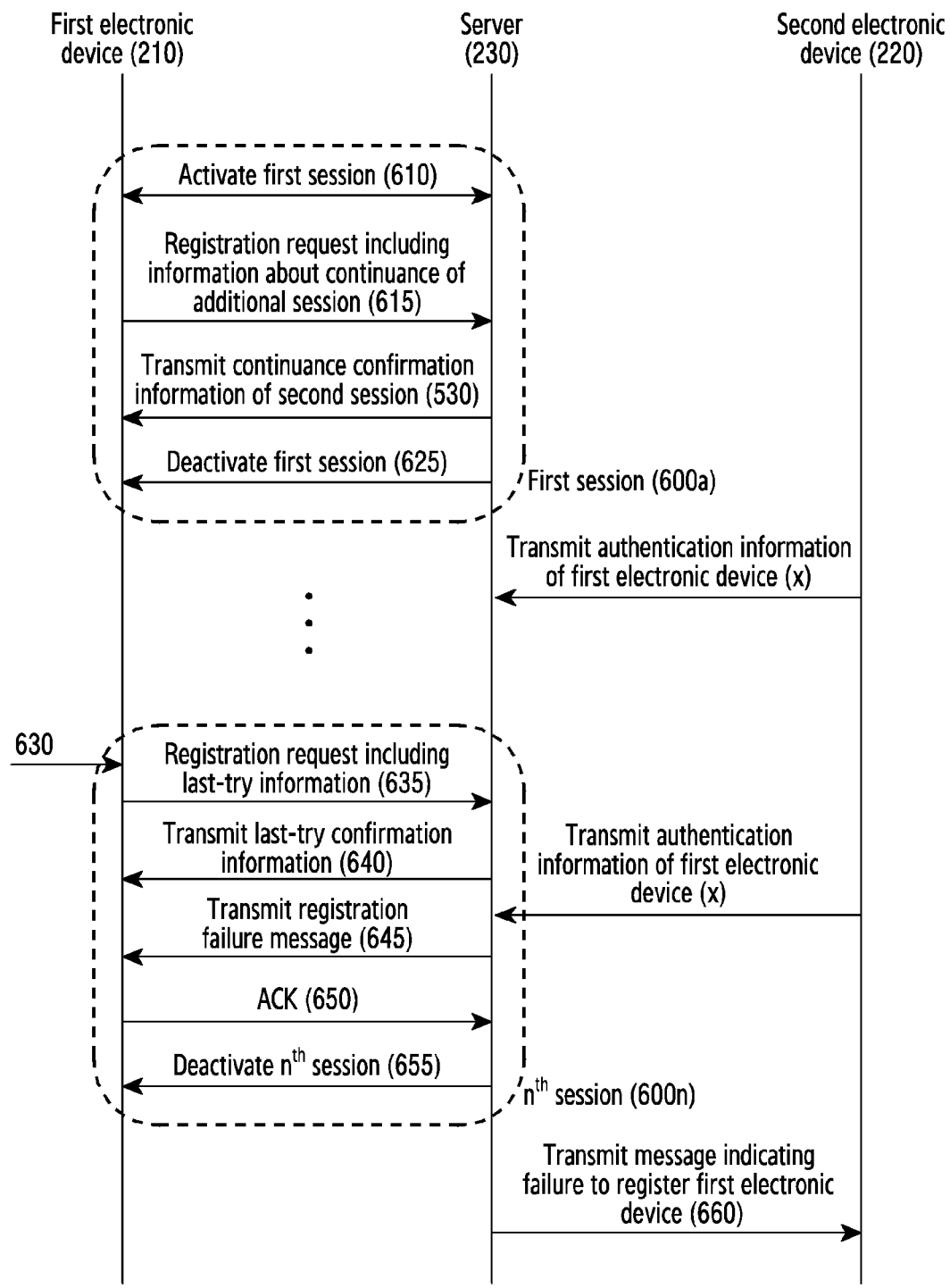
FIG. 6 illustrates signaling between a first electronic device, a server, and a second electronic device according to various embodiments of the disclosure.

FIG. 6 illustrates signaling between a first electronic device, a server, and a second electronic device according to various embodiments of the disclosure.

The first electronic device may be the first electronic device 210 illustrated in FIG. 2, the second electronic device may be the second electronic device 220 illustrated in FIG. 2, and the server may be the server 230 illustrated in FIG. 2.

Since operations 610 to 640 are the same as operations 510 to 540 illustrated in FIG. 5, a detailed description thereof will be omitted.

According to an embodiment, the server 230 may complete negotiations for deactivation of an additional session with the first electronic device 210 by transmitting last-try confirmation information to the first electronic device 210 in the $n^{th}$ session 500n. The server 230 may identify whether authentication information of the first electronic device 210 is received from the second electronic device 220 during at least some intervals in which activation of the $n^{th}$ session 500n is maintained. Since the server 230 completes negotiations with the first electronic device 210 so as not to activate the additional session after the $n^{th}$ session 500n is deactivated, the server 230 may identify whether the authentication information of the first electronic device 210 is received from the second electronic device 220 during only at least some intervals in which activation of the $n^{th}$ session 500n is maintained.

When the authentication information of the first electronic device 210 is not received from the second electronic device 220 (or when incorrect authentication information is received) during at least some intervals in which activation of the $n^{th}$ session 500n is maintained, the server 230 may transmit a registration failure message to the first electronic device 210 in operation 645.

In operation 650, the first electronic device 210 may transmit an ACK message to the server 230 in response to the registration failure message received in operation 645.

Since operation 655 is the same as operation 560 of FIG. 5, a detailed description thereof will be omitted.

In operation 660, the server 230 may transmit the message indicating failure to register the first electronic device 210 to the second electronic device 220. For example, the server 230 may transmit, to the second electronic device 220, a message indicating that registration of the first electronic device 210 has finally failed and that the registration procedure needs to be performed again from the beginning in order to register the first electronic device 210.

Although not illustrated, the server 230 may transmit the message indicating failure to register the first electronic device 210 to the first electronic device 210. The first electronic device 210, receiving the message indicating failure to register the first electronic device 210 from the server 230, may provide the user with a notification indicating that registration of the first electronic device 210 has failed through various output formats (for example, sounds and images).

Figure 7:
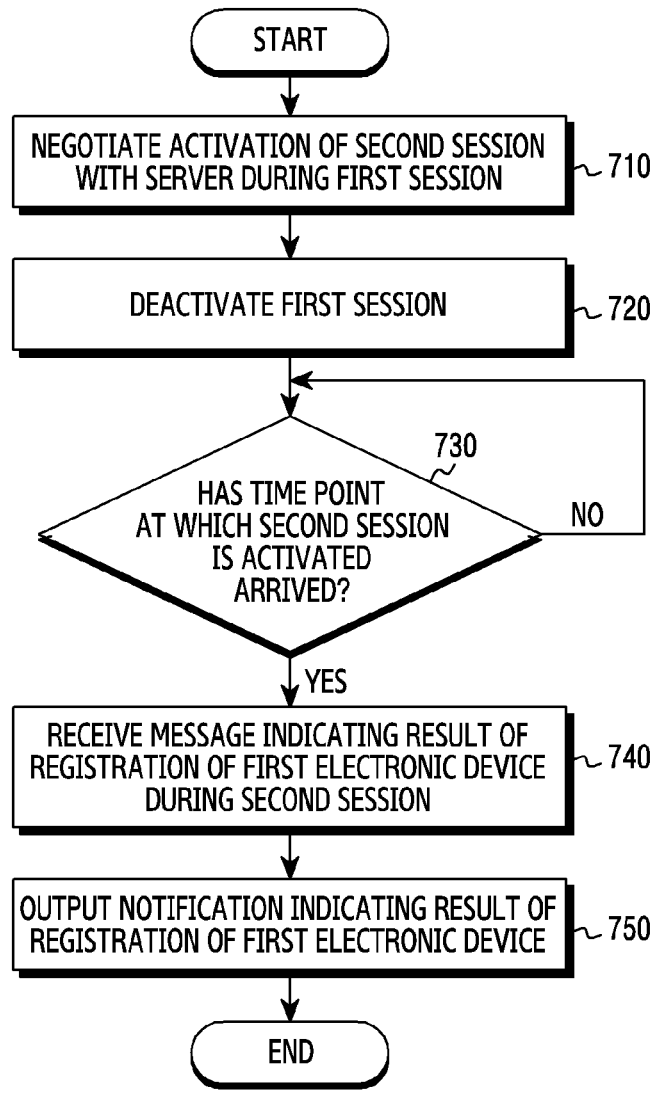
FIG. 7 is a flowchart illustrating the operation of a first electronic device according to various embodiments of the disclosure.

FIG. 7 is a flowchart illustrating the operation of a first electronic device according to various embodiments of the disclosure.

According to an embodiment, the first electronic device may be the first electronic device 210 illustrated in FIG. 2.

In operation 710, the first electronic device 210 may negotiate activation of a second session with the server 230 during a first session.

Although not illustrated, the first electronic device 210 may activate the first session with the server 230 before operation 710. For example, the first electronic device 210 may activate the first session by transmitting a signal making a request for activating the first session to the server 230 through the CoAP and receiving a positive response to activation of the first session from the server 230.

According to an embodiment, at least one of the first session or the second session may indicate a logical communication connection made between the first electronic device 210 and the server 230 in order to register the first electronic device 210 in the server 230.

According to an embodiment, the first electronic device 210 may negotiate activation of the second session with the server 230 by transmitting negotiation information on activation of the second session to the server 230 and receiving negotiation confirmation information on activation of the second session from the server 230 as a response to the negotiation information during the first session.

According to an embodiment, the negotiation information on activation of the second session may be information for negotiating whether to activate the second session after the first session is deactivated, and, if the second session is activated, when to activate the second session with the server 230. The negotiation information on activation of the second session may include continuance information for negotiating activation of the second session for a predetermined time period following another predetermined period after deactivation of the first session. For example, the first electronic device 210 may transmit continuance information for negotiating activation of the second session for three minutes, five minutes after deactivation of the first session to the server 230.

According to an embodiment, negotiation confirmation information on activation of the second session may be information confirmed by the server 230 for activation of the second session. The server 230 may confirm the information on activation of the second session by agreeing to or approving the negotiation information on activation of the second session received from the first electronic device 210 or changing some of the negotiation information. For example, when the first electronic device 210 transmits negotiation information indicating activation of the second session for three minutes, five minutes after deactivation of the first session, to the server 230, the server 230 may transmit negotiation confirmation information indicating activation of the second session for three minutes, four minutes after deactivation of the first session, to the first electronic device 210.

According to an embodiment, the first electronic device 210 may complete negotiations for activation of the second session with the server 230 by receiving the negotiation confirmation information from the server 230.

In operation 720, the first electronic device 210 may deactivate the first session. For example, the first electronic device 210 may deactivate the first session after the first electronic device 210 completes negotiations with the server 230 for activation of the second session for three minutes, four minutes after deactivation of the first session. The negotiation confirmation information on activation of the second session received from the server may include information on deactivation of the first session (for example, information on the time point at which the first session is deactivated), and the first electronic device 210 may deactivate the first session on the basis of the information on deactivation of the first session.

In operation 730, the first electronic device 210 may identify whether the time point at which the second session is activated arrives. The first electronic device 210 may identify whether the time point at which the second session is activated arrives on the basis of the result of negotiations with the server 230. When the time point at which the second session is activated does not arrive, the first electronic device 210 may repeatedly perform operation 730 until the time point at which the second session is activated arrives.

Although not illustrated, when the time point at which the second session is activated arrives, the first electronic device 210 and the server 230 may activate the second session.

In operation 740, the first electronic device 210 may receive a message indicating the result of registration of the first electronic device during the second session. The first electronic device 210 may receive a registration completion message or a message indicating failure to register the first electronic device 210 from the server 230. For example, when the server 230 receives authentication information for registering the first electronic device 210 from the second electronic device 220 before the second session is activated after deactivation of the first session, the first electronic device 210 may receive the registration completion message of the first electronic device 210 from the server 230 during the second session.

In operation 750, the first electronic device 210 may output a notification indicating the result of registration of the first electronic device 210. For example, when the first electronic device 210 receives the registration completion message from the server 230 during the second session, the first electronic device 210 may provide the user with a notification indicating successful completion of registration through the input/output interface 315.

Figure 8:
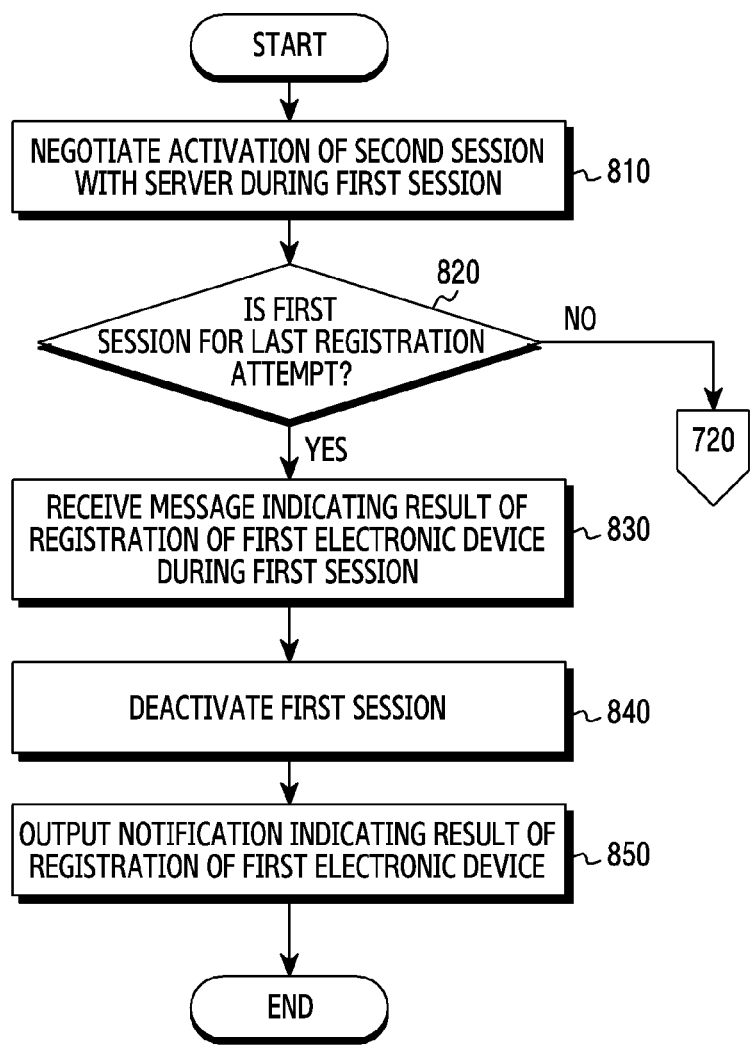
FIG. 8 is a flowchart illustrating the operation of a first electronic device according to various embodiments of the disclosure.

FIG. 8 is a flowchart illustrating the operation of a first electronic device according to various embodiments of the disclosure.

According to an embodiment, the first electronic device may be the first electronic device 210 illustrated in FIG. 2.

In operation 810, the first electronic device 210 may negotiate activation of a second session with the server 230 during a first session.

Although not illustrated, the first electronic device 210 may activate the first session with the server 230 before operation 810.

According to an embodiment, the first electronic device 210 may negotiate activation of the second session with the server 230 by transmitting negotiation information on activation of the second session to the server 230 and receiving negotiation confirmation information on activation of the second session from the server 230 as a response to the negotiation information during the first session.

According to an embodiment, the negotiation information on activation of the second session may include last-try information indicating non-activation of the second session after deactivation of the first session.

According to an embodiment, the negotiation confirmation information on activation of the second session may be information confirmed by the server 230 for activation of the second session. The server 230 may confirm negotiation confirmation information on activation of the second session by agreeing to or approving the negotiation information on activation of the second session received from the first electronic device 210 or changing some of the negotiation information. For example, when the first electronic device 210 transmits last-try information indicating non-activation of the second session to the server 230 during the first session, the server 230 may transmit last-try confirmation information for agreeing to or approving the received last-try information to the first electronic device 210.

According to an embodiment, the first electronic device 210 may transmit the last-try information indicating non-activation of the second session to the server 230 during the first session on the basis of information on the timer 310. For example, the first electronic device 210 may activate the timer 310 for a preset time before operation 810. When the timer 310 has expired (when the timer 310 is in the inactive state), the first electronic device 210 may transmit last-try information indicating non-activation of the second session to the server 230. The server 230 may transmit last-try confirmation information for agreeing to or approving the received last-try information to the first electronic device 210.

In operation 820, the first electronic device 210 may identify whether the first session is the session in which registration of the first electronic device 210 is to be attempted for the last time. For example, the first electronic device 210 may identify whether the first session is the last session in which registration of the first electronic device 210 is to be attempted by identifying whether the last-try confirmation information is received from the server 230 in operation 810.

When the first session is not the last session in which registration of the first electronic device 210 is to be attempted, the first electronic device 210 may perform operation 720 of FIG. 7. For example, the first electronic device 210 may identify that the first session is not the last session by receiving continuance confirmation information of the second session rather than the last-try confirmation information from the server 230. The first electronic device 210, receiving the continuance confirmation information of the second session, may deactivate the first session in operation 720 of FIG. 7. The first electronic device 210 may activate the second session with the server 230 on the basis of the continuance confirmation information of the second session.

When the first session is the last session in which registration of the first electronic device 210 is to be attempted, the first electronic device 210 may receive a message indicating the result of registration of the first electronic device from the server 230 during the first session in operation 830. For example, the server 230 may identify whether authentication information of the first electronic device 210 is received from the second electronic device 220 during at least some intervals in which activation of the first session is maintained and transmit the result to the first electronic device 210. For example, when the server 230 receives authentication information of the first electronic device 210 from the second electronic device 220 during at least some intervals in which activation of the first session is maintained, the first electronic device 210 may receive a registration completion message from the server 230. In another example, when the server 230 does not receive authentication information of the first electronic device 210 from the second electronic device 220 during at least some intervals in which activation of the first session is maintained, the first electronic device 210 may receive a registration failure message from the server 230.

In operation 840, the first electronic device 210 may deactivate the first session. For example, the first electronic device 210 may deactivate the first session by deleting the value of a parameter related to the first session.

In operation 850, the first electronic device 210 may output a notification indicating the result of registration of the first electronic device 210. For example, when the first electronic device 210 receives the registration completion message from the server 230 during the first session, the first electronic device 210 may provide the user with a notification indicating successful completion of registration through the input/output interface 315. In another example, when the first electronic device 210 receives the registration failure message from the server 230 during the first session, the first electronic device 210 may provide a notification indicating final failure of registration through the input/output interface 315.

Figure 9:
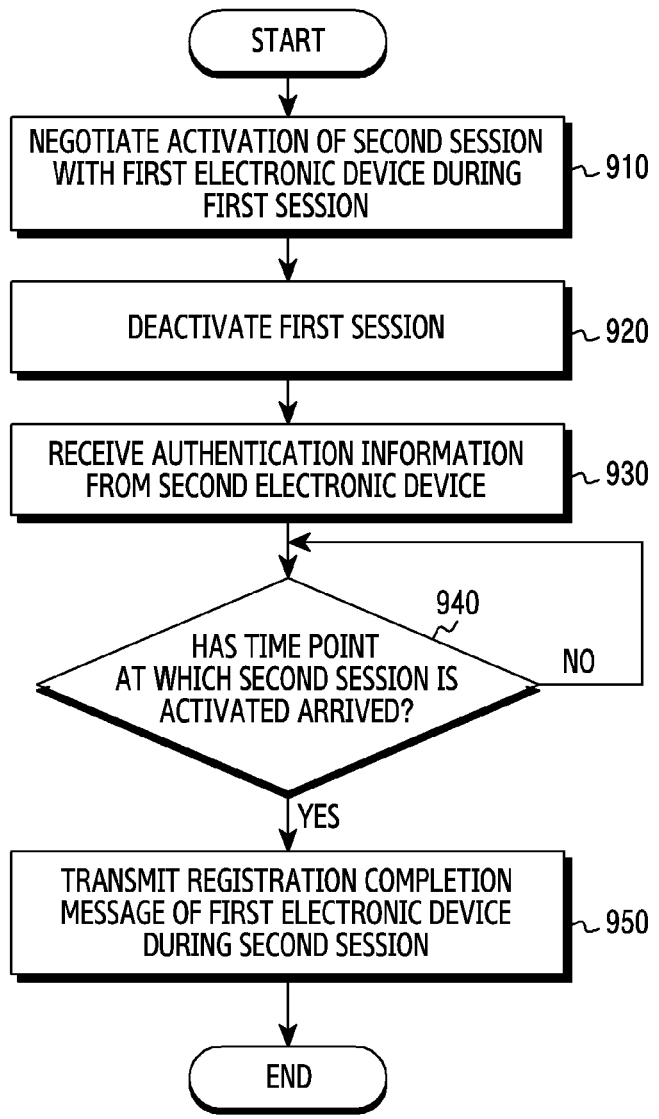
FIG. 9 is a flowchart illustrating the operation of a server according to various embodiments of the disclosure.

FIG. 9 is a flowchart illustrating the operation of a server according to various embodiments of the disclosure.

According to an embodiment, the server may be the server 230 illustrated in FIG. 2.

In operation 910, the server 230 may negotiate activation of a second session with the first electronic device 210 during a first session.

Although not illustrated, the server 230 may activate the first session with the first electronic device 210 before operation 910.

According to an embodiment, the server 230 may receive negotiation information on activation of the second session from the first electronic device 210 and transmit negotiation confirmation information on activation of the second session to the first electronic device 210 in response to the negotiation information during the first session so as to negotiate activation of the second session with the first electronic device 210.

According to an embodiment, the negotiation information on activation of the second session may include continuance information for negotiating activation of the second session for a predetermined time period following another predetermined period after deactivation of the first session.

According to an embodiment, negotiation confirmation information on activation of the second session may be information confirmed by the server 230 for activation of the second session. The server 230 may confirm information related to activation of the second session by agreeing to or approving the negotiation information on activation of the second session received from the first electronic device 210. For example, when the first electronic device 210 transmits negotiation information indicating activation of the second session for three minutes, five minutes after deactivation of the first session, to the server 230, the server 230 may confirm information related to activation of the second session by agreeing to or approving the negotiation information on activation of the second session received from the first electronic device 210.

According to an embodiment, the server 230 may change some of the negotiation information on activation of the second session received from the first electronic device 210 on the basis of context information of the server 230. The server 230 may confirm information related to activation of the second session by changing some of the negotiation information on activation of the second session. For example, when the number of clients currently connected to the server 230 is larger than a reference value, the server 230 may change some of the negotiation information on activation of the second session and thus determine negotiation confirmation information on activation of the second session.

In operation 920, the server 230 may deactivate the first session. For example, the server 230 may deactivate the first session after completing negotiations with the first electronic device 210 to activate the second session for three minutes, four minutes after deactivation of the first session.

In operation 930, the server 230 may receive authentication information from the second electronic device 220. According to an embodiment, the server 230 may receive authentication information for registration of the first electronic device 210 from the second electronic device 220 before the second session is activated after deactivation of the first session.

According to an embodiment, the authentication information for registration of the first electronic device 210 may include at least one piece of account information to be linked with the identification information of the first electronic device 210 and stored or the identification information of the first electronic device 210. For example, the server 230 may receive account information of the user of the first electronic device 210 and the identification information of the first electronic device 210.

In operation 940, the server 230 may identify whether the time point at which the second session is activated arrives. The server 230 may identify whether the time point at which the second session is activated arrives on the basis of the result of negotiations with the first electronic device 210.

When the time point at which the second session is activated does not arrive, the server 230 may repeatedly perform operation 940 until the time point at which the second session is activated arrives.

When the time point at which the second session is activated arrives, the server 230 may transmit a registration completion message of the first electronic device 210 during the second session in operation 950.

According to an embodiment, the server 230 may transmit the registration completion message of the first electronic device 210 during the second session on the basis of the authentication information that was received from the second electronic device 220 before activation of the second session after deactivation of the first session. For example, the server 230 may compare the identification information received from the second electronic device 220 before activation of the second session with the identification information received from the first electronic device 210 during the first session, and when pieces of the identification information are the same as each other, transmit the registration completion message to the first electronic device 210 during the second session. In another example, the server 230 may compare the identification information received from the second electronic device 220 before activation of the second session with the identification information of the first electronic device stored in the memory 130b of the server 230.

Figure 10:
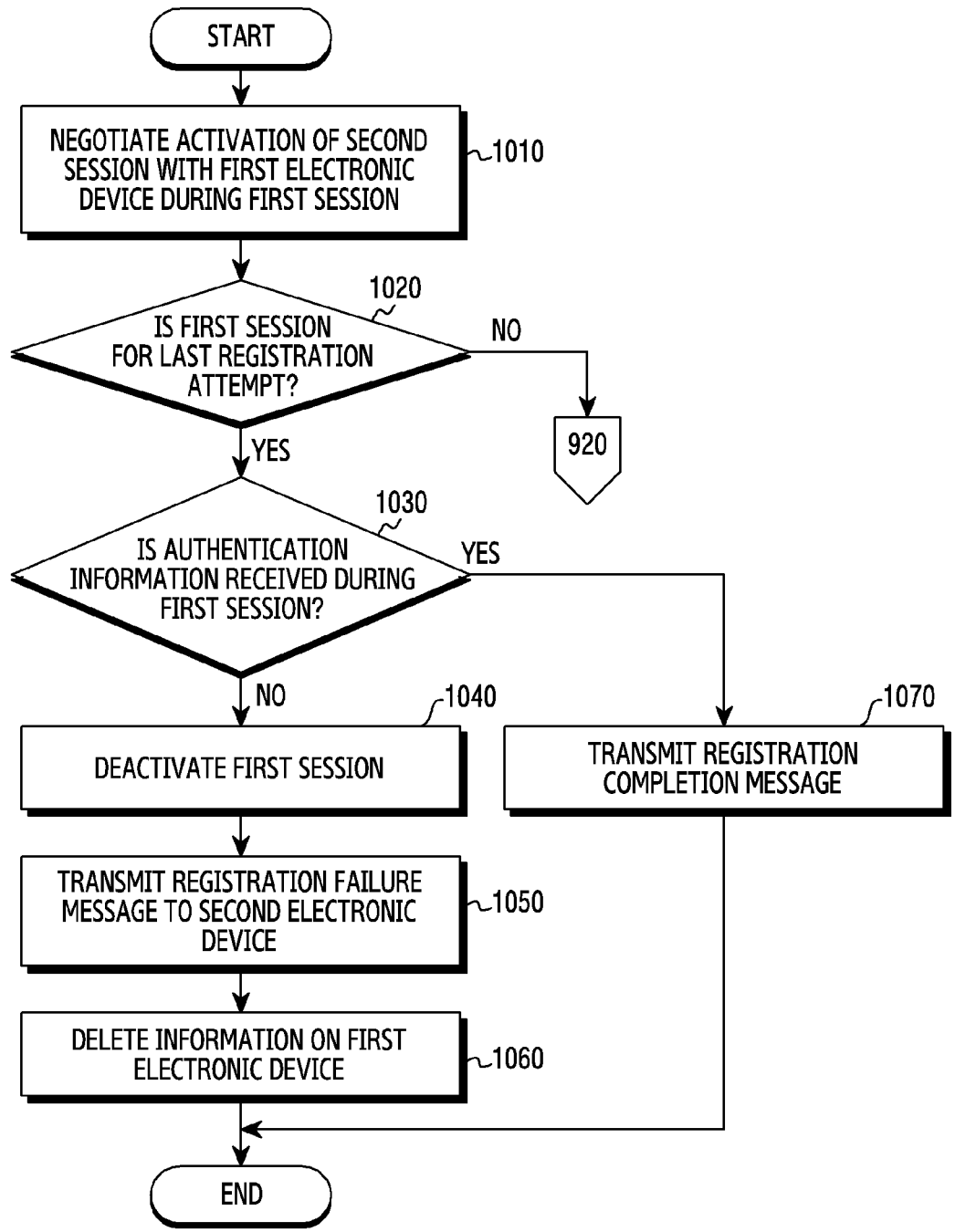
FIG. 10 is a flowchart illustrating the operation of a server according to various embodiments of the disclosure.

FIG. 10 is a flowchart illustrating the operation of a server according to various embodiments of the disclosure.

According to an embodiment, the server may be the server 230 illustrated in FIG. 2.

In operation 1010, the server 230 may negotiate activation of a second session with the first electronic device 210 during a first session.

Although not illustrated, the server 230 may activate the first session with the first electronic device 210 before operation 1010.

According to an embodiment, the server 230 may receive negotiation information on activation of the second session from the first electronic device 210 and transmit negotiation confirmation information on activation of the second session to the first electronic device 210 in response to the negotiation information during the first session so as to negotiate activation of the second session with the first electronic device 210.

According to an embodiment, negotiation information on activation of the second session may include last-try information indicating non-activation of the second session after deactivation of the first session.

According to an embodiment, the first electronic device 210 may transmit the last-try information indicating non-activation of the second session to the server 230 during the first session on the basis of information on the timer 310. For example, the first electronic device 210 may activate the timer 310 for a preset time before activation of the first session with the server 230. When the timer 310 has expired (when the timer 310 is in the inactive state), the first electronic device 210 may transmit last-try information indicating non-activation of the second session to the server 230.

According to an embodiment, negotiation confirmation information on activation of the second session may be information confirmed by the server 230 for activation of the second session. The server 230 may determine negotiation confirmation information on activation of the second session by agreeing to or approving the negotiation information on activation of the second session received from the first electronic device 210 or changing some of the negotiation information. For example, when the first electronic device 210 transmits last-try information indicating non-activation of the second session to the server 230 after deactivation of the first session, the server 230 may transmit last-try confirmation information for agreeing to or approving the received last-try information to the first electronic device 210.

In operation 1020, the server 230 may identify whether the first session is the last session in which the first electronic device 210 is to attempt registration. The server 230 may identify whether the first session is the session in which registration of the first electronic device 210 is to be attempted for the last time on the basis of the negotiation confirmation information on activation of the second session transmitted to the first electronic device 210 during the first session. For example, the server 230 may identify whether the negotiation confirmation information on activation of the second session transmitted to the first electronic device 210 during the first session includes last-try confirmation information.

When the first session is not the session in which registration of the first electronic device 210 is to be attempted for the last time, the server 230 may perform operation 920 of FIG. 9. For example, when continuance confirmation information of the second session, rather than the last-try confirmation information, is received from the first electronic device 210, or when negotiations for activation of the second session with the first electronic device 210 are rejected in operation 1010, the first session may be deactivated in operation 920 of FIG. 9. The server 230 may activate the second session with the first electronic device 210 on the basis of the continuance confirmation information of the second session.

When the first session is the session in which registration of the first electronic device 210 is to be attempted for the last time, the server 230 may determine whether authentication information for registration of the first electronic device 210 is received from the second electronic device during the first session in operation 1030. For example, the server 230 may determine whether authentication information of the first electronic device 210 is received from the second electronic device 220 during at least some intervals in which activation of the first session is maintained.

When the authentication information of the first electronic device 210 is not received from the second electronic device 220 during at least some intervals in which activation of the first session is maintained, the server 230 may deactivate the first session in operation 1040. For example, the server 230 may deactivate the first session by deleting the value of a parameter related to the first session.

In operation 1050, the server 230 may transmit a registration failure message to the second electronic device 220. For example, the server 230 may transmit, to the second electronic device 220, a message indicating that registration of the first electronic device 210 has finally failed and that the registration procedure needs to be performed again from the beginning in order to register the first electronic device 210.

Although not illustrated, the server 230 may transmit the message indicating failure to register the first electronic device 210 to the first electronic device 210. The first electronic device 210, receiving the message indicating failure to register the first electronic device 210 from the server 230, may provide the user with a notification indicating that registration of the first electronic device 210 has failed through any of various output formats (for example, sounds and images).

In operation 1060, the server 230 may delete information on the first electronic device 210 stored in the memory 130*b*. Since the server 230 has completed negotiations with the first electronic device 210 so as not to activate an additional session after deactivation of the first session, the server 230 may perform garbage collection by deleting information on the first electronic device 210 stored in the memory 130*b* when authentication information is not received during the first session. For example, the server 230 may delete all of the information on previous registration attempts by the first electronic device 210.

According to an embodiment, when the authentication information of the first electronic device 210 is received from the second electronic device 220 during at least some intervals in which activation of the first session is maintained, the server 230 may transmit a registration completion message to at least one of the first electronic device 210 or the second electronic device 220 on the basis of the received authentication information of the first electronic device 210 in operation 1070.

A method of operating an electronic device (for example, the electronic device 101 or the first electronic device 210) or a processor of the electronic device (for example, the processor 120*a* of the first electronic device 210) according to various embodiments of the disclosure may include an operation of negotiating activation of a second session for registration of the electronic device with a server (for example, the server 230) during a first session for registration of the electronic device, an operation of deactivating the first session, an operation of activating the second session, based on a result of the negotiation, an operation of receiving a message indicating the result of registration of the electronic device from the server during the second session, and an operation of outputting a notification indicating the result of registration of the electronic device.

According to various embodiments, the method may further include an operation of transmitting a request for registering the electronic device to the server during the first session, and the registration request may include identification information of the electronic device.

According to various embodiments, the operation of negotiating the activation of the second session for registration of the electronic device with the server may include an operation of activating a timer (for example, the timer 310) for a preset time and an operation of negotiating activation of the second session for registration of the electronic device with the server, based on information on the timer.

According to various embodiments, the operation of negotiating the activation of the second session for registration of the electronic device with the server may include an operation of transmitting negotiation information on activation of the second session to the server and receiving negotiation confirmation information on activation of the second session from the server during the first session.

According to various embodiments, the operation of transmitting the negotiation information on activation of the second session to the server may include an operation of transmitting the negotiation information on activation of the second session to the server in response to identification of the activated state of the timer.

According to various embodiments, the negotiation information on activation of the second session may include information on at least one of the time point at which the second session is activated or the time during which activation of the second session is maintained.

According to various embodiments, when the server receives authentication information for registration of the electronic device from an external electronic device after deactivation of the first session, the message indicating the result of registration of the electronic device may be a message indicating successful completion of registration of the electronic device.

According to various embodiments, the negotiation confirmation information on activation of the second session may be information having at least some changes from the negotiation information on activation of the second session.

A method of operating a server (for example, the server 230) or a processor of the server (for example, the processor 120*b* of the server 230) according to various embodiments of the disclosure may include an operation of negotiating activation of a second session for registration of an electronic device (for example, the electronic device 101 or the first electronic device 210) with the server with the electronic device during a first session for registration of the electronic device, an operation of deactivating the first session, an operation of determining whether authentication information for registration of the electronic device is received from an external device (for example, the second electronic device 220), an operation of activating the second session, based on a result of the negotiation, and an operation of transmitting a message indicating the result of registration of the electronic device to the electronic device, based on whether the authentication information is received, during the second session.

According to various embodiments, the authentication information for registration of the electronic device may include identification information of the electronic device, the method may further include an operation of receiving a registration request for the electronic device from the electronic device during the first session, the registration request including identification information of the electronic device, an operation of comparing identification information of the electronic device included in the registration request with the identification information of the electronic device included in the authentication information, and an operation of determining the result of registration of the electronic device based on the result of the comparison.

Embodiments pertaining to the specifications and drawings present only specific examples for easy explanation of the disclosure and for assisting understanding of the disclosure, but do not limit the scope of the disclosure. Therefore, it should be construed that not only the embodiments disclosed herein but also all modifications or modification forms capable of being derived on the basis of the technical idea of the disclosure are included in the scope of the disclosure.

The invention claimed is:

1. An electronic device comprising:
a wireless communication circuit;
a processor operatively coupled to the wireless communication circuit; and
a memory operatively coupled to the processor,
wherein the memory stores instructions causing the processor to, when executed, negotiate activation of a second session for registration of the electronic device with a server during a first session for registration of the electronic device, deactivate the first session, activate the second session, based on a result of the negotiation, receive a message indicating a result of registration of the electronic device from the server during the second session, and output a notification indicating the result of the registration of the electronic device.

2. The electronic device of claim 1, wherein the instructions cause the processor to transmit a registration request including identification of the electronic device to the server during the first session.

3. The electronic device of claim 2, further comprising a timer operatively coupled to the processor,
wherein the instructions cause the processor to activate the timer for a preset time and negotiate activation of the second session with the server, based on information on the timer.

4. The electronic device of claim 3, wherein the instructions cause the processor to transmit negotiation information on activation of the second session to the server and receive negotiation confirmation information on activation of the second session from the server during the first session.

5. The electronic device of claim 4, wherein the instructions cause the processor to transmit the negotiation information on activation of the second session to the server in response to identification of an activated state of the timer.

6. The electronic device of claim 5, wherein the negotiation information on activation of the second session includes information on at least one of a time point at which the second session is activated or a time for which activation of the second session is maintained.

7. The electronic device of claim 6, wherein, when the server receives authentication information for registration of the electronic device from an external electronic device after deactivation of the first session, the message indicating the result of registration of the electronic device is a message indicating successful completion of registration of the electronic device.

8. The electronic device of claim 4, wherein the negotiation confirmation information on activation of the second session is information having at least some changes from the negotiation information on activation of the second session.

9. The electronic device of claim 8, wherein the negotiation confirmation information on activation of the second session is determined according to data learned based on information on a plurality of sessions related to a plurality of clients having attempted registration in the server.

10. The electronic device of claim 1, wherein the instructions cause the processor to negotiate activation of the second session with the server through a Constrained Application Protocol (CoAP) during the first session.

11. A method of operating an electronic device, the method comprising:
negotiating activation of a second session for registration of the electronic device with a server during a first session for registration of the electronic device;
deactivating the first session;
activating the second session, based on a result of the negotiation;
receiving a message indicating a result of registration of the electronic device from the server during the second session; and
outputting a notification indicating the result of the registration of the electronic device.

12. The method of claim 11, further comprising transmitting a registration request for the electronic device to the server during the first session, wherein the registration request includes identification information of the electronic device.

13. The method of claim 12, wherein the negotiating of the activation of the second session for registration of the electronic device with the server comprises:
activating a timer for a preset time; and
negotiating activation of the second session for registration of the electronic device with the server, based on information on the timer.

14. A method of operating a server, the method comprising:
negotiating activation of a second session for registration of an electronic device with the server with the electronic device during a first session for registration of the electronic device;
deactivating the first session;
determining whether authentication information for registration of the electronic device is received from an external device;
activating the second session, based on a result of the negotiation; and
transmitting a message indicating a result of registration of the electronic device to the electronic device, based on whether the authentication information is received, during the second session.

15. The method of claim 14, wherein the authentication information for registration of the electronic device includes identification information of the electronic device,
the method further comprising:
receiving a registration request for the electronic device from the electronic device during the first session, the registration request including identification information of the electronic device;
comparing identification information of the electronic device included in the registration request with the identification information of the electronic device included in the authentication information; and
determining a result of registration of the electronic device, based on a result of the comparison.

16. The method of claim 13, wherein the negotiating of the activation of the second session for registration of the electronic device with the server comprises:
transmitting negotiation information on activation of the second session to the server during the first session; and
receiving negotiation confirmation information on activation of the second session from the server during the first session.

17. The method of claim 16, wherein the transmitting negotiation information on activation of the second session to the server comprises:
transmitting the negotiation information on activation of the second session to the server in response to identification of an activated state of the timer.

18. The method of claim 17, wherein the negotiation information on activation of the second session includes information on at least one of a time point at which the second session is activated or a time for which activation of the second session is maintained.

19. The method of claim 18, wherein, when the server receives authentication information for registration of the electronic device from an external electronic device after deactivation of the first session, the message indicating the result of registration of the electronic device is a message indicating successful completion of registration of the electronic device.

20. The method of claim 16, wherein the negotiation confirmation information on activation of the second session is information having at least some changes from the negotiation information on activation of the second session.

* * * * *